United States Patent
Kim et al.

(10) Patent No.: US 9,444,895 B2
(45) Date of Patent: Sep. 13, 2016

(54) APPARATUS AND METHOD FOR BIDIRECTIONAL PAIRING BETWEEN DEVICES

(75) Inventors: Jin-Hyoung Kim, Hwaseong-si (KR); Hun-Je Yeon, Seoul (KR); Chi-Hyun Cho, Seoul (KR); Pil-Seob Kang, Suwon-si (KR); Hun Lim, Seongnam-si (KR); Seong-Il Hahm, Siheung-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 64 days.

(21) Appl. No.: 13/364,202

(22) Filed: Feb. 1, 2012

(65) Prior Publication Data

US 2012/0198098 A1 Aug. 2, 2012

(30) Foreign Application Priority Data

Feb. 1, 2011 (KR) .................. 10-2011-0009974

(51) Int. Cl.
  *G06F 3/00* (2006.01)
  *H04L 29/08* (2006.01)
  *H04N 1/00* (2006.01)

(52) U.S. Cl.
  CPC ............ *H04L 67/16* (2013.01); *H04L 67/04* (2013.01); *H04L 67/36* (2013.01); *H04N 1/00307* (2013.01); *H04N 1/00477* (2013.01); *H04N 2201/0072* (2013.01)

(58) Field of Classification Search
  None
  See application file for complete search history.

(56) References Cited

U.S. PATENT DOCUMENTS

| | | | |
|---|---|---|---|
| 7,130,584 B2 | 10/2006 | Hirvonen | |
| 7,711,861 B2 * | 5/2010 | Yuval | ............................... 710/8 |
| 2004/0192206 A1 | 9/2004 | Hirvonen | |
| 2006/0267860 A1 | 11/2006 | Rinaldo, Jr. et al. | |
| 2008/0113618 A1 | 5/2008 | De Leon et al. | |
| 2009/0195402 A1 * | 8/2009 | Izadi et al. | ................. 340/686.6 |
| 2010/0164693 A1 * | 7/2010 | Zhang et al. | ............... 340/10.31 |
| 2011/0161822 A1 * | 6/2011 | Meghdies Vardeh et al. ... 710/8 | |
| 2012/0092235 A1 | 4/2012 | Ham et al. | |
| 2012/0197351 A1 * | 8/2012 | Olson et al. | .................... 607/61 |

FOREIGN PATENT DOCUMENTS

KR 20120039364 A 4/2012

* cited by examiner

*Primary Examiner* — Idriss N Alrobaye
*Assistant Examiner* — Dayton Lewis-Taylor

(57) ABSTRACT

An apparatus and a method support bidirectional pairing between devices. A connectable peripheral device is discovered. A list of discovered connectable peripheral devices is displayed. When a peripheral device is selected from the displayed list of the discovered connectable peripheral devices, an indicator operation request message for operating an indicator of the selected peripheral device is generated and transmitted to the selected device. The selected peripheral device operates the indicator according to the indicator operation request message to indicate a connection request from the device.

18 Claims, 11 Drawing Sheets

APPARATUS AND METHOD FOR BIDIRECTIONAL PAIRING BETWEEN DEVICES

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Feb. 1, 2011 and assigned Ser. No. 10-2011-0009974, the entire disclosure of which is hereby incorporated by reference.

TECHNICAL FIELD OF THE INVENTION

The present invention relates to pairing. More particularly, the present invention relates to an apparatus and a method for bidirectional pairing between devices.

BACKGROUND OF THE INVENTION

Convergence in the field of Information Technology (IT) denotes that digital technology-based various products or services merge together, such that they are born as a product or service of a new type. In other words, the convergence is a concept including not only incorporating devices with two different functions, respectively, into one device to provide in the form of a product but also using a physically separated different device or service via one device. The convergence may appear in the form of merge of a device and a device, a device and a service, and a service and a service.

To use a different device or service, a user should discover a currently available device or service. This is denoted by a device discovery or a service discovery. The conventional device or service discovery method displays a name or a Medium Access Control (MAC) address of a discovered device on a screen. Accordingly, a user should accurately know the name or the MAC address that the user intends to connect to every time. In addition, generally, a user does not change a device name into a name easy for the user to recognize but uses a name set in advance. In this situation, the same name is frequently used for each model, and when a plurality of same models exist, it is difficult for the user to recognize a device to which the user intends to connect.

SUMMARY OF THE INVENTION

To address the above-discussed deficiencies of the prior art, it is a primary aspect of the present invention is to address at least the above-mentioned problems and/or disadvantages and to provide at least the advantages described below. Accordingly, an aspect of the present invention is to provide an apparatus and a method for bidirectional pairing between devices.

Another aspect of the present invention is to provide an apparatus and a method for allowing a user to easily recognize a discovered device and try connection by operating a unique indicator (for example, a Light Emitting Diode (LED), a vibrating motor, a speaker, and a display) that the user can easily recognize to intuitively discriminate each device.

Still another aspect of the present invention is to provide an apparatus and a method for connection between devices without a display.

In accordance with an aspect of the present invention, a method in a device for operating a discover request device to pair with peripheral devices is provided. At least one connectable peripheral device is discovered. A list of discovered connectable peripheral devices is displayed. When a peripheral device is selected from the displayed list of the discovered connectable peripheral devices, an indicator operation request message for operating an indicator of the selected peripheral device is generated and transmitted to the selected device. The selected peripheral device operates the indicator according to the indicator operation request message to indicate a connection request from the device.

In accordance with another aspect of the present invention, a method for operating a device that receives a discover request for pairing between devices is provided. A device discover request message is received from a peripheral device. A device discover response message is generated and transmitted to the peripheral device. An indicator operation request message requesting an operation of an indicator is received from the peripheral device. The indicator is operated according to the indicator operation request message.

In accordance with another aspect of the present invention, an apparatus of a device for pairing between devices is provided. The apparatus includes a device discover request unit and a connection input unit. The device discover request unit discovers at least one connectable peripheral device. The connection input unit displays a list of discovered connectable peripheral devices, controls the device discover request unit to generate an indicator operation request message when a peripheral device is selected from the displayed list of the discovered connectable peripheral devices, and transmits the generated indicator operation request message to the selected peripheral device. The indicator operation request message is used to indicate a connection request from the device.

In accordance with yet another aspect of the present invention, an apparatus of a device that receives a discover request for pairing between devices is provided. The apparatus includes a device discover response unit and a connection indicator. The device discover unit receives a device discover request message from a peripheral device, generates a device discover response message, transmits the generated device discover response message to the peripheral device, and receives an indicator operation request message for requesting an operation of an indicator from the peripheral device. The connection indicator operates the indicator according to the indicator operation request message.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device.

The terms and words used in the following description and claims are not limited to the bibliographical meanings, but are merely used by the inventor to enable a clear and consistent understanding of the invention. Accordingly, it should be apparent to those skilled in the art that the following description of embodiments of the present invention are provided for illustrative purposes only and not for the purpose of limiting the invention as defined by the appended claims and their equivalents.

Embodiments of the present invention provide an alternative for bidirectional pairing between devices.

Though the following description discloses a device that requests a discover and a device that receives a discover request are discriminated as separate devices in the following description, one device may be configured to include both functionalities.

Figure 1:
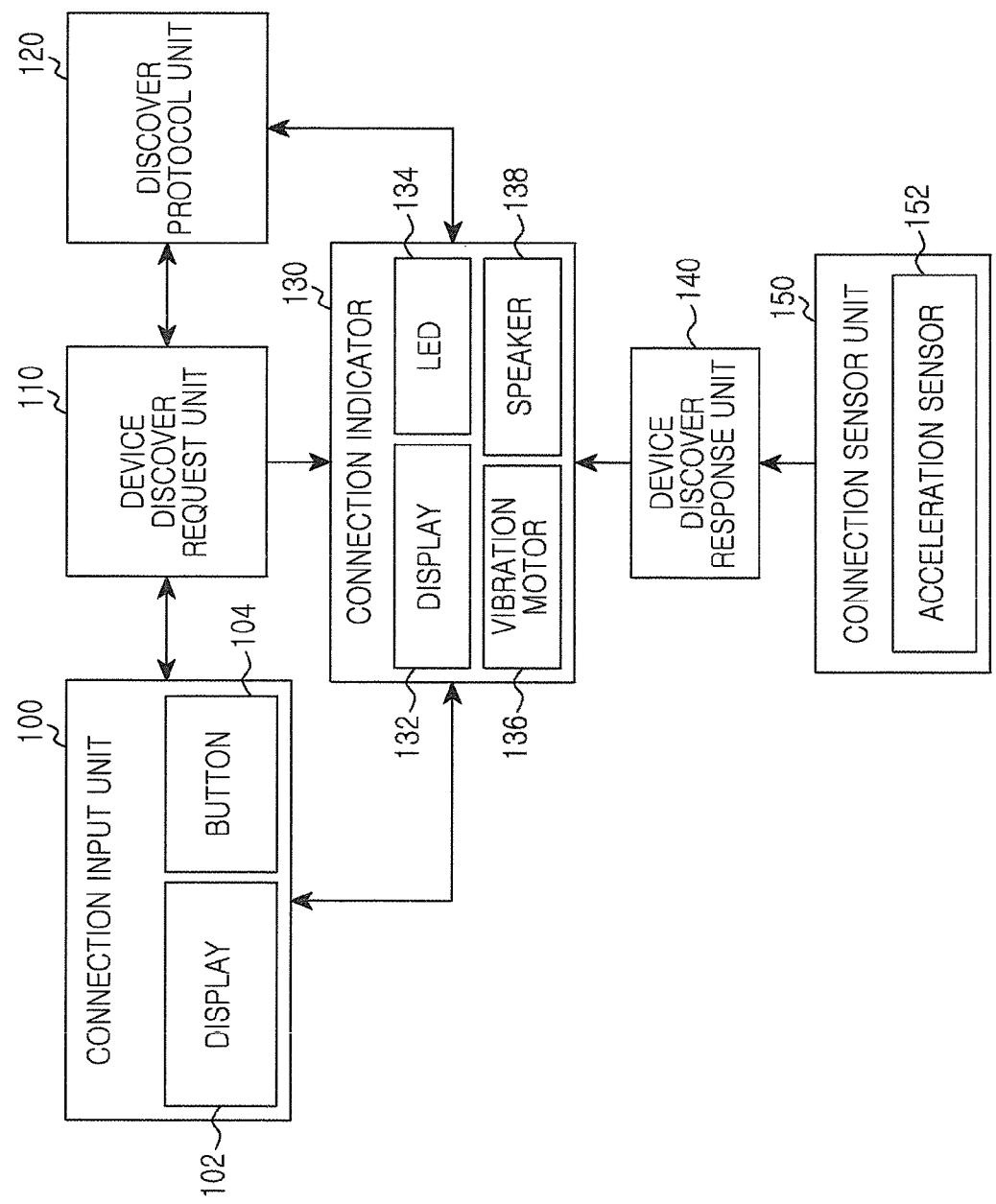
FIG. 1 is a block diagram of a device for bidirectional pairing between devices according to an embodiment of the present invention.

FIG. 1 is a block diagram of a device for bidirectional pairing between devices according to an embodiment of the present invention.

As illustrated, the device includes a connection input unit 100, a device discover request unit 110, a discover protocol unit 120, a connection indicator 130, a device discover response unit 140, and a connection sensor unit 150.

Figure 2:
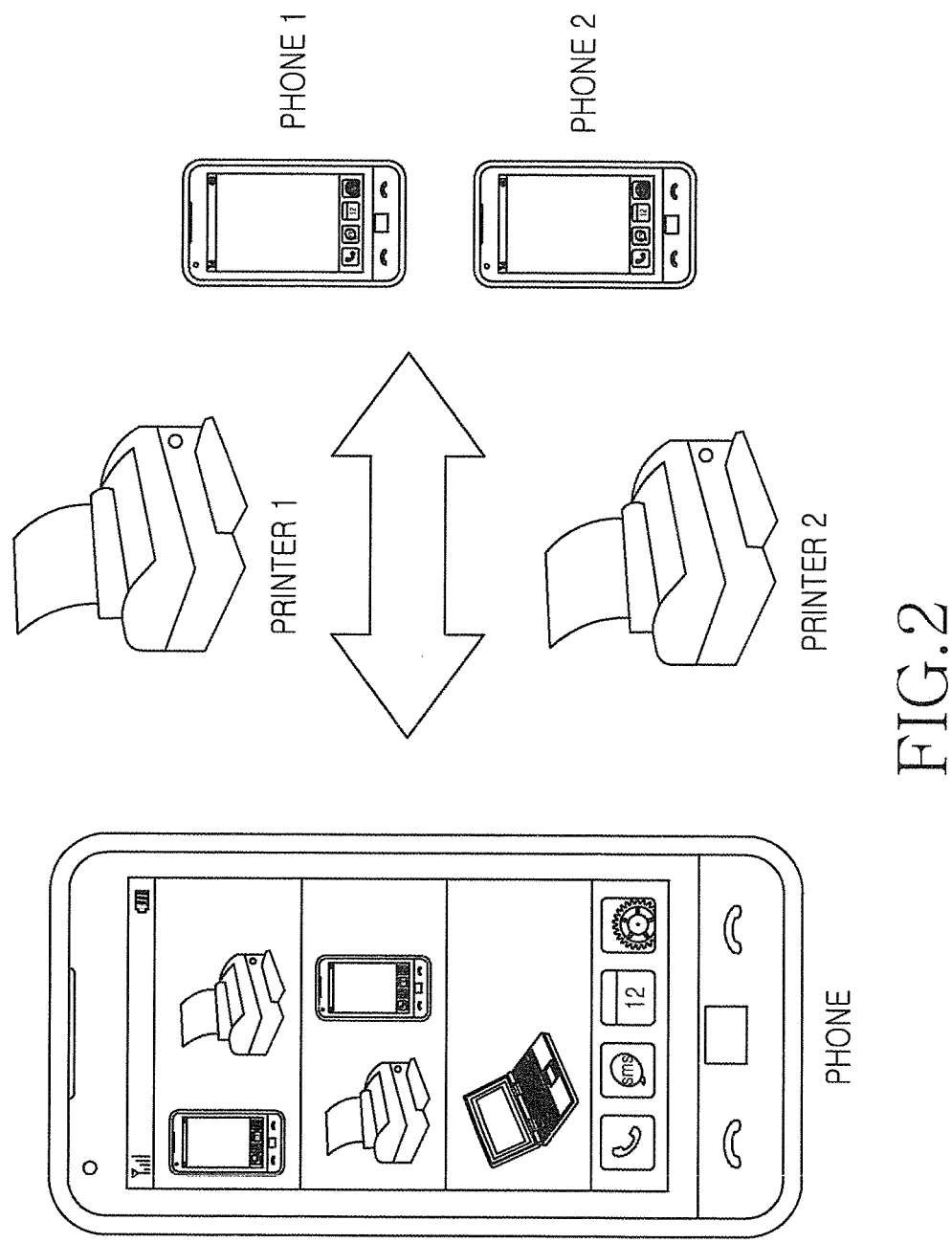
FIG. 2 is a view of a process for displaying a list of connectable devices through discover on a display according to an embodiment of the present invention.
Figure 3:
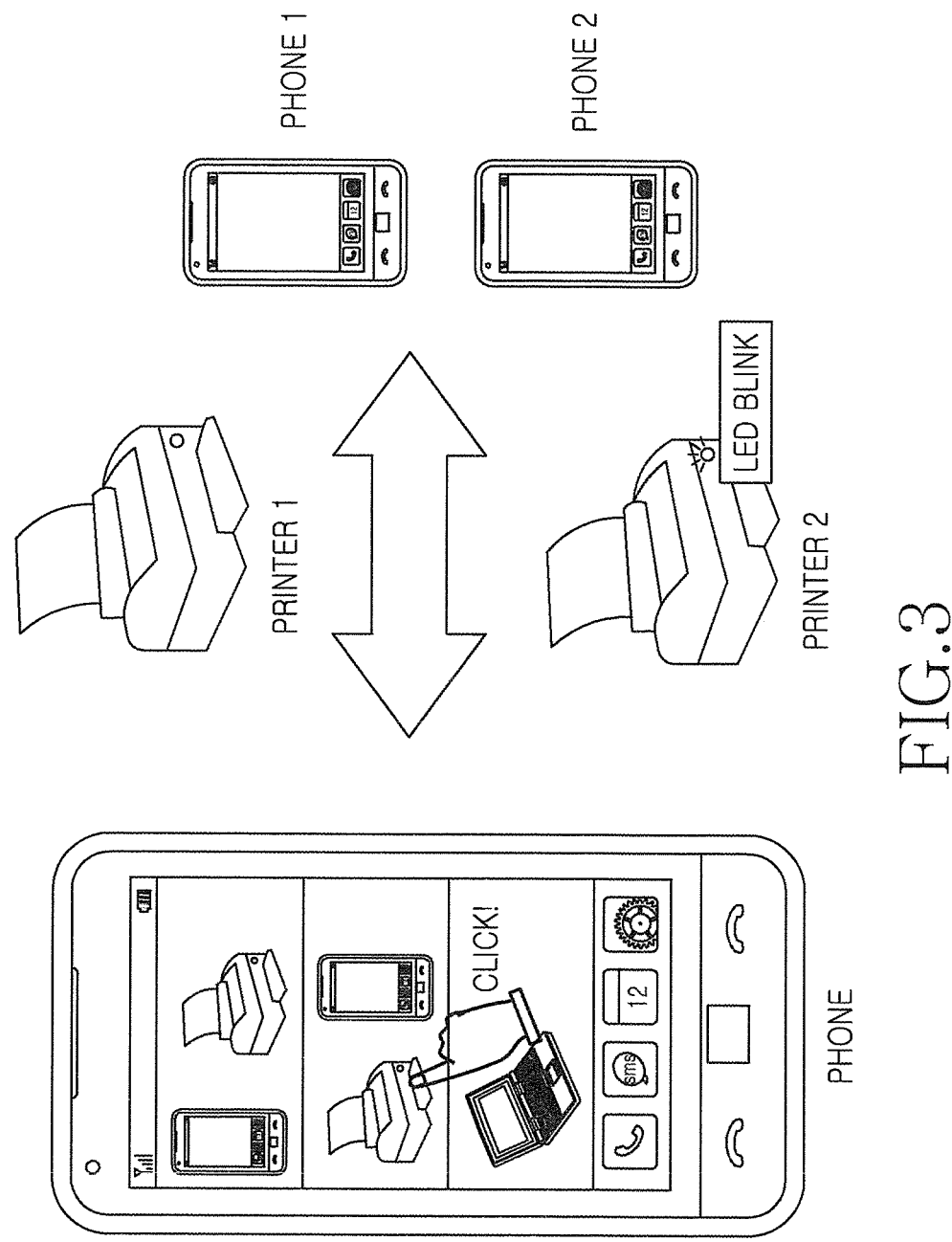
FIG. 3 is a view of a process for allowing a user to intuitively recognize a connection-requested device by operating an indicator in the connection-requested device according to an embodiment of the present invention.
Figure 4:
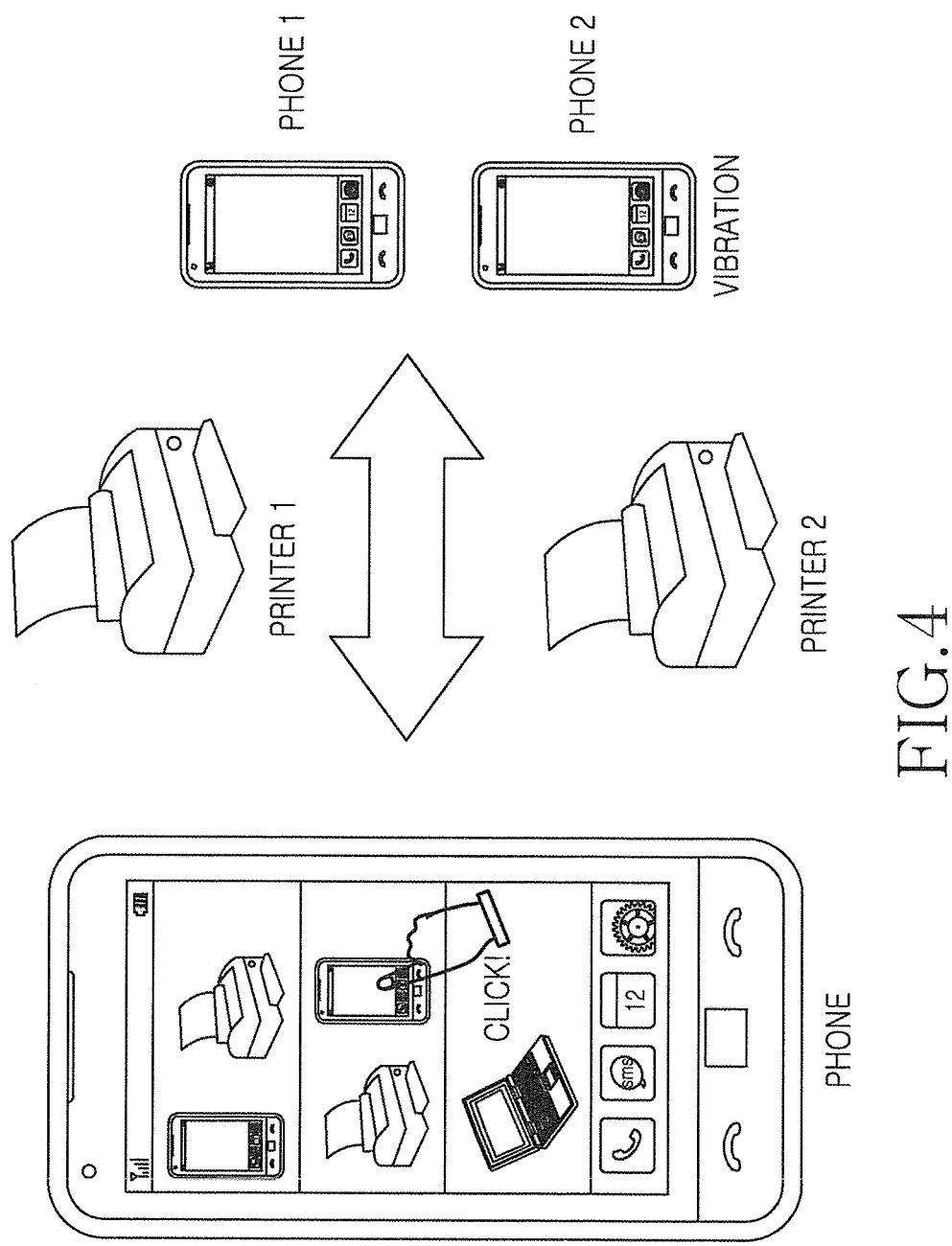
FIG. 4 is a view of a process for allowing a user to intuitively recognize a connection-requested device by operating an indicator in the connection-requested device according to an embodiment of the present invention.
Figure 5:
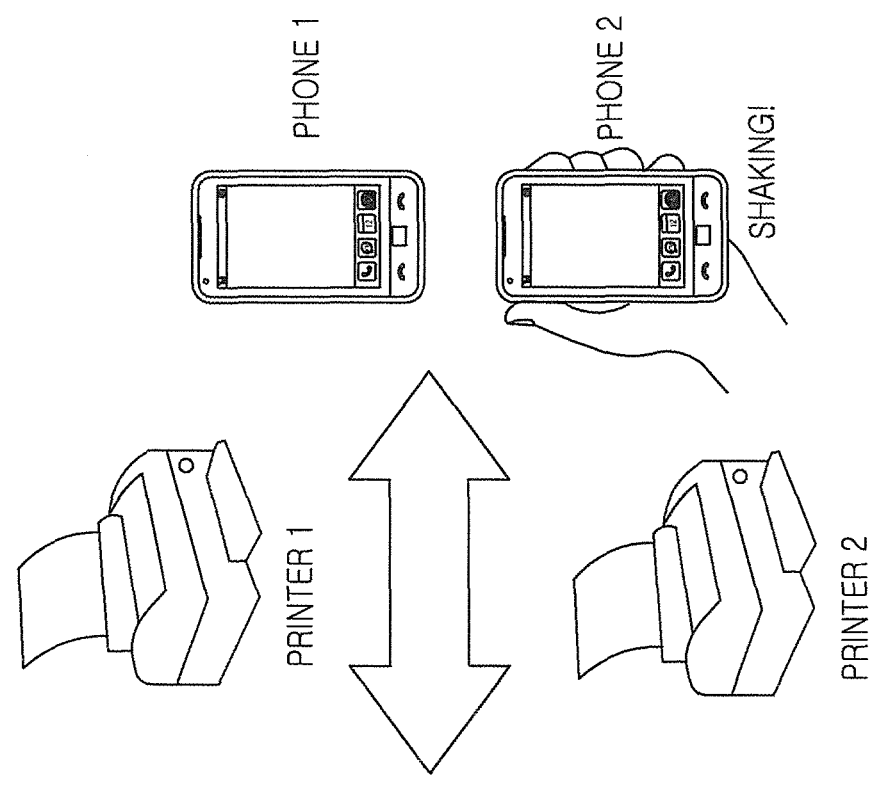
FIG. 5 is a view of a process for allowing a user to intuitively recognize a device that the user intends to connect to by operating an indicator in a device that requests a connection according to an embodiment of the present invention.
Figure 5:
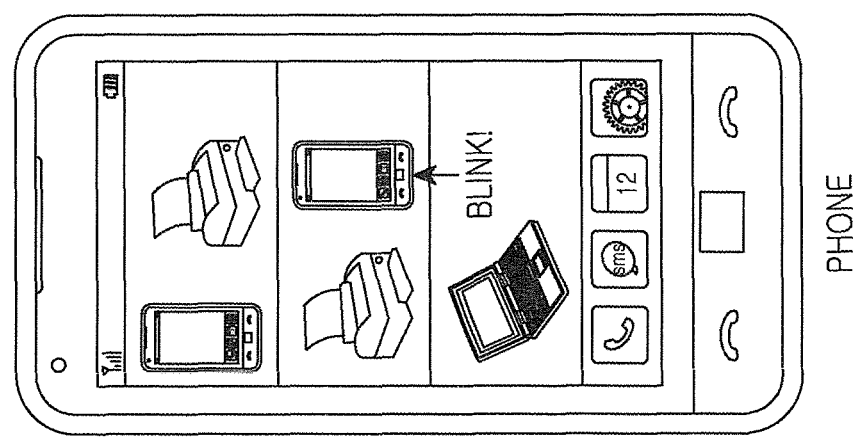

Referring to FIG. 1, the connection input unit 100 includes a first display 102 and a button 104. The connection input unit 100 of the device that requests a discover receives a user input for a connectable device discover request, generates a device discover request message via the device discover request unit 110 to transmit the same to peripheral devices, and receives a device discover response message. The connection input unit 100 of the device that requests the discover displays a list of connectable devices on the display 102 based on the received device discover response message as illustrated in FIG. 2. Also, according to an embodiment, when a device that a user desires to connect to is selected from the list of the devices according to afterward user input, the connection input unit 100 of the device that requests a discover generates an indicator operation request message requesting an indicator operation of the selected device via the device discover request unit 110, requests a connection by transmitting the generated indicator operation request message to the selected device, and receives an indicator operation response and connection response message. Here, when a connection approval/rejection is input according to a user input, a connection input unit 100 of a device that receives a connection request generates a connection response message including a connection response information (that is, connection approval/rejection) or an indicator operation response and connection response message via the device discover response unit 140, and transmits the generated message to the device that requests the connection.

The device discover request unit 110 generates a device discover request message to be transmitted to peripheral devices according to a device discover request from the connection input unit 100 or an application. Here, the device discover request message includes information regarding a device type or a service type to which the user desires to connect. In addition, according to an embodiment of the present invention, the device discover request unit 110 generates an indicator operation request message to be transmitted to a peripheral device according to an indicator operation request from the connection input unit 100.

The discover protocol unit 120 transmits a message from the device discover request unit 110 or the device discover response unit 140 via the connection indicator 130 to peripheral devices via a network, and provides a message received from peripheral devices to the device discover request unit 110 or the device discover response unit 140 via the network including the connection indicator 130. Generally, examples of a protocol that provides device and service discover in an Internet Protocol (IP) network include a Universal Plug and Play (UPnP), Bonjour, Devices Profile for Web Services (DPWS), and such.

The connection indicator 130 may include one of at least a second display 132, an LED 134, a vibration motor 136, and a speaker 138. Here, the display means a displaying means. According to an embodiment of the present invention, the connection indicator 130 of a device that receives a connection request operates an indicator based on an indicator operation request message from a device that requests a connection. That is, the connection indicator 130 operates an indicator such as the second display 132, the LED 134, the vibration motor 136, and the speaker 138 depending on a device characteristic to inform a user that a connection from a different device is requested. For example, the connection indicator 130 may allow an LED to blink according to FIG. 3, generate vibration according to FIG. 4, or output an alarm signal via the speaker. Accordingly, a user may recognize that a connection from a different device is requested. According to an embodiment of the present invention, the connection indicator 130 of the device that requests a connection operates an indicator based on an indicator operation request message from a device that receives a connection request. For example, according to FIG. 5, the connection indicator 130 may allow an icon corresponding to a peripheral device whose movement has been recognized to blink in the list of the connectable devices displayed on the first display 102.

The device discover response unit 140 extracts information regarding a device type or a service type that a user desires to discover from a device discover request message received from a peripheral device, and generates a device discover response message to be transmitted to the peripheral device based on the extracted information. In addition, according to an embodiment, the device discover response unit 140 of a device that receives a connection request generates an indicator operation response and connection response message to be transmitted to a device that requests a connection based on connection response information (that is, connection approval/rejection) from the connection input unit 100. According to an embodiment, the device discover response unit 140 of a device that receives a connection request generates an indicator operation request message to be transmitted to a device that requests a connection based on movement recognition information from the connection sensor unit 150, and generates a connection response message based on connection response information (that is, connection approval/rejection) from the connection input unit 100.

The connection sensor unit 150 includes an acceleration sensor 152, and detects a movement of a device to provide movement recognition information to the device discover response unit 140.

Figure 6:
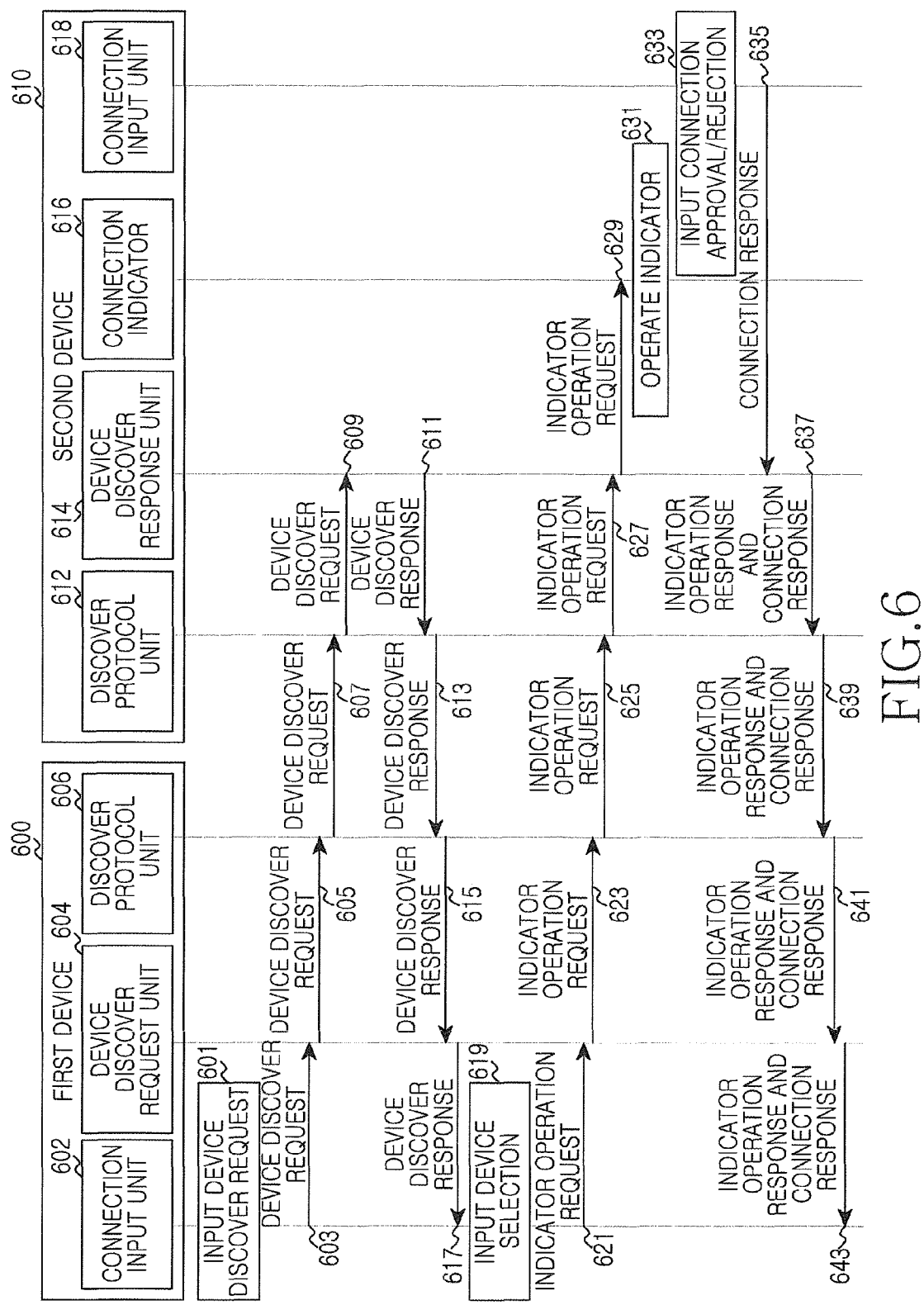
FIG. 6 is a diagram of a process for bidirectional pairing between devices according to an embodiment of the present invention.

FIG. 6 illustrates a process for bidirectional pairing between devices according to an embodiment of the present invention. Here, a first device denotes a device that request a discover, and a second device denotes a device that receives a discover request.

Referring to FIG. 6, when a connectable device discover request is input according to a user input in step 601, a connection input unit 602 of the first device 600 requests a device discover request unit 604 of the first device 600 to discover a device in step 603.

The device discover request unit 604 of the first device 600 generates a device discover request message according to a device discover request from the connection input unit 602 or a device discover request by an application, and provides the same to a discover protocol unit 606 of the first device 600 in step 605. Here, the device discover request message includes information regarding a device type or a service type that the user desires to discover.

The discover protocol unit 606 of the first device 600 transmits a device discover request message from the device discover request unit 604 to peripheral devices, for example, a second device 610 via a network in step 607. Generally, examples of a protocol that provides device and service discover in an Internet Protocol (IP) network include a Universal Plug and Play (UPnP), Bonjour, Devices Profile for Web Services (DPWS), and such.

A discover protocol unit 612 of the second device 610 provides a device discover request message from the first device 600 received from the network to a device discover response unit 614 of the second device 610 in step 609.

The device discover response unit 614 of the second device 610 extracts information regarding a device type or a service type that a user desires to discover from the received device discover request message, determines whether the device or service to be discovered via the device discover request message is the second device 610 itself or a service supported by the second device 610 based on the extracted information, and then generates a device discover response message including the determination results to provide the same to the discover protocol unit 612 of the second device 610 in step 611.

The discover protocol unit 612 of the second device 610 transmits a device discover response message from the device discover response unit 614 to the first device 600 via the network in step 613.

The discover protocol unit 606 of the first device 600 provides a device discover response message from the second device 610 received from the network to the device discover request unit 604 of the first device 600 in step 615.

The device discover request unit 604 of the first device 600 provides a device discover response message from the discover protocol unit 606 to the connection input unit 602 of the first device 600 in step 617.

The connection input unit 602 of the first device 600 displays a list of connectable devices on a display based on the device discover response message from the device discover request unit 604. After that, when selection of one device to be connected is input in the list of the devices according to a user input in step 619, the connection input unit 602 requests the device discover request unit 604 of the first device 600 to operate an indicator of the selected device, for example, the second device 610 in order to intuitively inform the user of the selected device that a connection from the first device 600 is requested in step 621.

The device discover request unit 604 of the first device 600 generates an indicator operation request message according to an indicator operation request of the second device 610 from the connection input unit 602 to provide the same to the discover protocol unit 606 of the first device 600 in step 623.

The discover protocol unit 606 of the first device 600 transmits an indicator operation request message from the device discover request unit 604 to the second device 610 via the network in step 625.

The discover protocol unit 612 of the second device 610 provides the indicator operation request message from the first device 600 received via the network to the device discover response unit 614 of the second device 610 in step 627.

The device discover response unit 614 of the second device 610 provides the received indicator operation request message to the connection indicator 616 of the second device 610 in step 629.

The connection indicator 616 of the second device 610 operates an indicator based on the indicator operation request message from the device discover response unit 614 in step 631. That is, the connection indicator 616 operates an indicator such as a display, an LED, a vibration motor, and a speaker depending on a device characteristic to inform a user of the second device 610 that a connection from a different device is requested. For example, the connection indicator 616 may allow the LED to blink, generate vibration, or output an alarm signal via the speaker. Accordingly, the user of the second device 610 may recognize that a connection from a different device (e.g. first device 600) is requested, and input whether to approve the connection request (an indicator operation request message) from the different device via the connection input unit 618 of the second device 610.

When a connection approval/rejection is input according to a user input in step 633, the connection input unit 618 of the second device 610 transmits connection response information (that is, a connection approval/rejection) to the device discover response unit 614 of the second device 610 in step 635.

The device discover response unit 614 of the second device 610 generates an indicator operation response and connection response message including connection response information from the connection input unit 618 to provide the same to the discover protocol unit 612 of the second device 610 in step 637.

The discover protocol unit 612 of the second device 610 transmits the indicator operation response and connection response message from the device discover response unit 614 to the first device 600 via the network in step 639.

The discover protocol unit 606 of the first device 600 provides the indicator operation response and connection response message from the second device 610 received via the network to the device discover request unit 604 of the first device 600 in step 641.

The device discover request unit 604 of the first device 600 provides the indicator operation response and connection response message from the discover protocol 606 to the connection input unit 602 of the first device 600 in step 643.

Figure 7:
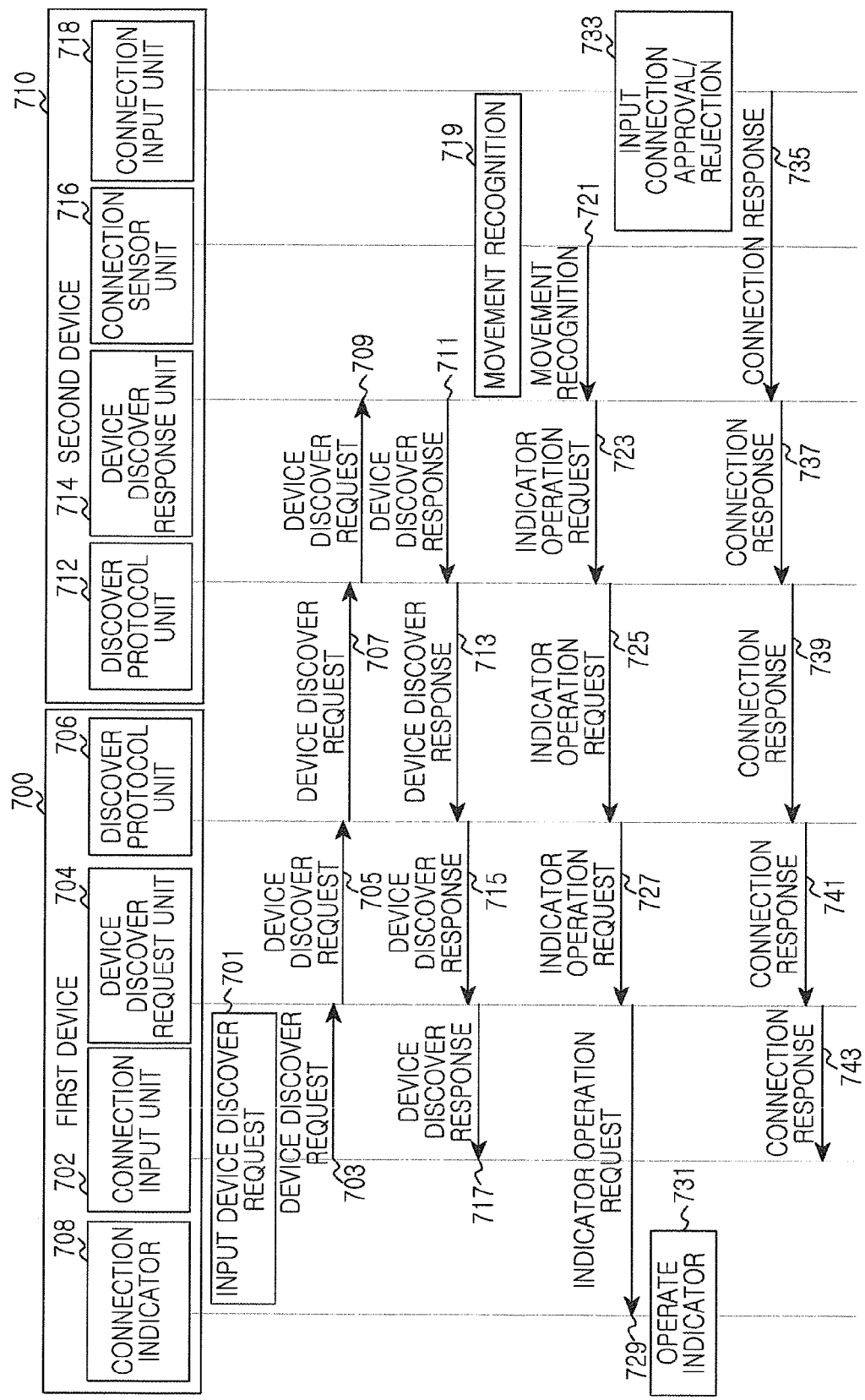
FIG. 7 is a diagram of a process for bidirectional pairing between devices according to an embodiment of the present invention.

FIG. 7 illustrates a process for bidirectional pairing between devices according to an embodiment of the present invention. Here, a first device denotes a device that request a discover, and a second device denotes a device that receives a discover request.

Referring to FIG. 7, when a connectable device discover request is input according to a user input in step 701, a connection input unit 702 of the first device 700 requests a device discover request unit 704 of the first device 700 to discover a device in step 703.

The device discover request unit 704 of the first device 700 generates a device discover request message according to a device discover request from the connection input unit 702 or a device discover request by an application, and provides the same to a discover protocol unit 706 of the first device 700 in step 705. Here, the device discover request message includes information regarding a device type or a service type that the user desires to discover.

The discover protocol unit 706 of the first device 700 transmits a device discover request message from the device discover request unit 704 to peripheral devices, for example, a second device 710 via a network in step 707. Generally, examples of a protocol that provides device and service discover in an Internet Protocol (IP) network include a Universal Plug and Play (UPnP), Bonjour, Devices Profile for Web Services (DPWS), and such.

A discover protocol unit 712 of the second device 710 provides a device discover request message from the first device 700 received from the network to a device discover response unit 714 of the second device 710 in step 709.

The device discover response unit 714 of the second device 710 extracts information regarding a device type or a service type that a user desires to discover from the received device discover request message, determines whether the device or service to be discovered via the device discover request message is the second device 710 itself or a service supported by the second device 710 based on the extracted information, and then generates a device discover response message including the determination results to provide the same to the discover protocol unit 712 of the second device 710 in step 711.

The discover protocol unit 712 of the second device 710 transmits a device discover response message from the device discover response unit 714 to the first device 700 via the network in step 713.

The discover protocol unit 706 of the first device 700 provides a device discover response message from the second device 710 received from the network to the device discover request unit 704 of the first device 700 in step 715.

The device discover request unit 704 of the first device 700 provides a device discover response message from the discover protocol unit 706 to the connection input unit 702 of the first device 700 in step 717. Accordingly, the connection input unit 702 of the first device 700 may display a list of connectable devices on a display based on a device discover response message from the device discover request unit 704.

Here, a user of the second device 710 may shake and move the second device 710 in order to operate an indicator of the first device 700 such that the second device 710 is intuitively recognized on the list of the connectable devices displayed on the display of the first device 700. Therefore, when the movement of the second device 710 is recognized in step 719, a connection sensor unit 716 of the second device 710 provides movement recognition information to the device discover response unit 714 in step 721.

The device discover response unit 714 of the second device 710 generates an indicator operation request message based on the movement recognition information from the connection sensor unit 716 to provide the same to the discover protocol unit 712 of the second device 710 in step 723.

The discover protocol unit 712 of the second device 710 transmits an indicator operation request message from the device discover response unit 714 to the first device 700 via the network in step 725.

The discover protocol unit 706 of the first device 700 provides the indicator operation request message from the second device 710 received via the network to the device discover request unit 704 of the first device 700 in step 727.

The device discover request unit 704 of the first device 700 provides the received indicator operation request message to a connection indicator 708 of the first device 700 in step 729.

The connection indicator 708 of the first device 700 operates an indicator based on the indicator operation request message from the device discover request unit 704 in step 731. For example, the connection indicator 708 allows an icon corresponding to the second device 710 whose movement has been recognized to blink in the list of the connectable devices displayed on the display.

When a connection approval/rejection for the first device 700 is input according to a user input in step 733, a connection input unit 718 of the second device 710 transmits connection response information (that is, a connection approval/rejection) to the device discover response unit 714 of the second device 710 in step 735.

The device discover response unit 714 of the second device 710 generates a connection response message including connection response information from the connection input unit 718 to provide the same to the discover protocol unit 712 of the second device 710 in step 737.

The discover protocol unit 712 of the second device 710 transmits the connection response message from the device discover response unit 714 to the first device 700 via the network in step 739.

The discover protocol unit 706 of the first device 700 provides the connection response message from the second device 710 received via the network to the device discover request unit 704 of the first device 700 in step 741.

The device discover request unit 704 of the first device 700 provides the connection response message from the discover protocol 706 to the connection input unit 702 of the first device 700 in step 743.

Figure 8:
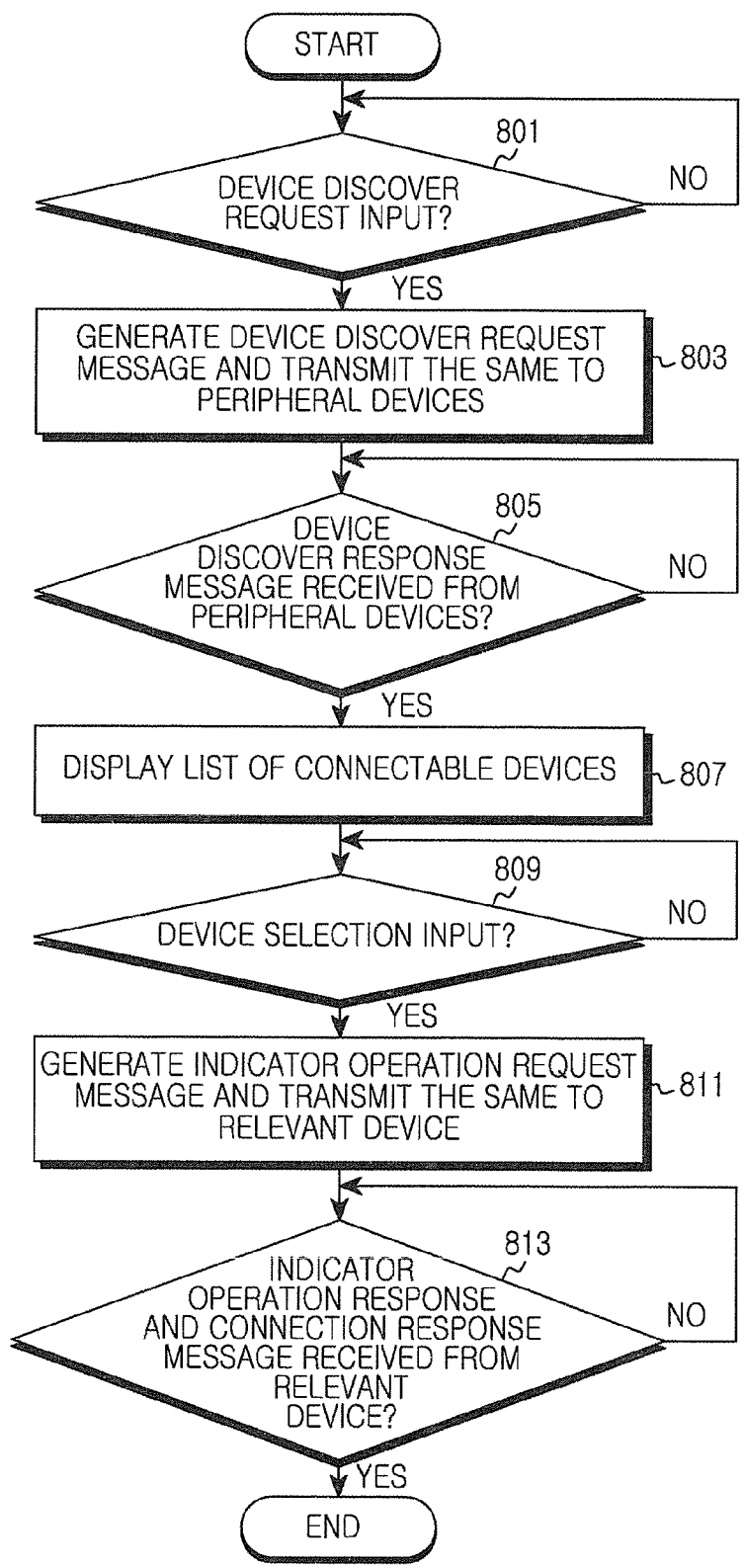
FIG. 8 illustrates a process for supporting bidirectional pairing between devices at a first device that requests a discover according to an embodiment of the present invention.

FIG. 8 illustrates a process for supporting bidirectional pairing between devices at a first device that requests a discover according to an embodiment of the present invention.

Referring to FIG. 8, the first device determines whether a connectable device discover request is input according to a user input or an application in step 801.

When the connectable device discover request is input according to a user input or an application in block 801, the first device generates a device discover request message and transmits the generated device discover request message to peripheral devices (for example, a second device) via a network in block 803. Here, the device discover request message includes information regarding a device type or a service type that the user desires to discover.

The first device determines whether device discover response messages are received from the peripheral devices via the network in block 805.

When one or more device discover response messages are received from the peripheral devices in block 805, the first device displays a list of connectable devices corresponding to information regarding a device type or a service type within the discover request message based on the device discover response messages received from the peripheral devices in block 807.

The first device determines whether selection of one device to be connected is input in the list of the devices according to user input in block 809.

When the selection of a device to be connected is input in the list of the devices according to the user input in block 809, the first device generates an indicator operation request message for operating an indicator of the selected device in order to intuitively inform a user of the selected device that a connection from the first device is requested, and transmits the generated indicator operation request message to the selected device via the network in block 811. Accordingly, the selected device may operate an indicator such as a display, an LED, a vibration motor, and a speaker depending on a device characteristic to inform the user that the connection from the first device is requested. For example, the selected device may allow an LED to blink, generate a vibration, or output an alarm signal via a speaker. Accordingly, the user of the selected device may recognize that the connection from the first device is requested, and input whether to approve the connection request from the first device to the selected device. Accordingly, an indicator operation response and connection response message including connection response information (that is, connection approval/rejection) may be provided to the first device via the network.

Therefore, the first device determines whether an indicator operation response and connection response message is received from the selected device via the network in block 813.

When the indicator operation response and connection response message is received from the selected device via the network in block 813, the first device ends the algorithm according to an embodiment of the present invention.

Figure 9:
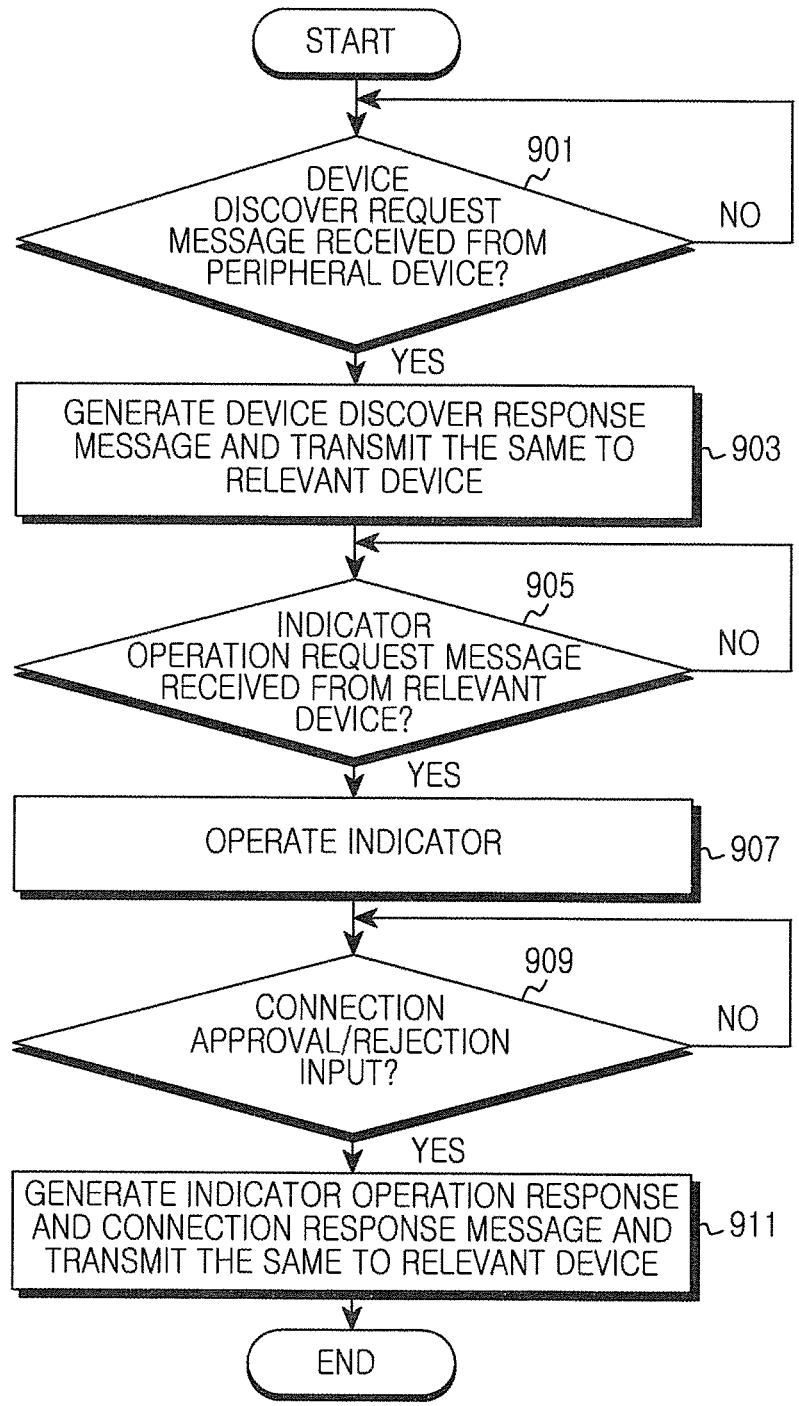
FIG. 9 illustrates a process for supporting bidirectional pairing between devices at a second device that receives a discover request according to an embodiment of the present invention.

FIG. 9 illustrates a process for supporting bidirectional pairing between devices at a second device that receives a discover request according to an embodiment of the present invention.

Referring to FIG. 9, the second device determines whether a device discover request message is received from a peripheral device (for example, a first device) via a network in block 901. Here, the device discover request message includes information regarding a device type or a service type that a user desires to discover.

When the device discover request message is received from the peripheral device via the network in block 901, the second device extracts information regarding a device type or a service type that a user desires to discover from the received device discover request message, determines whether a device or a service that the user desires to discover via the device discover request message is the second device itself or a service supported by the second device based on the extracted information, and provides a device discover response message including the determination results to a relevant peripheral device via the network in block 903. Accordingly, the relevant peripheral device displays a list of connectable devices on a display based on the device discover response message. After that, when selection of one device to be connected is input in the list of the devices according to the user input, the peripheral device may generate an indicator operation request message requesting an indicator operation of the selected device in order to intuitively inform a user of the selected device that a connection from the peripheral device is requested, and transmit the generated message to the selected device via the network.

Therefore, the second device determines whether an indicator operation request message is received from a relevant peripheral device via the network in block 905.

When the indicator operation request message is received from the relevant peripheral device via the network in block 905, the second device operates an indicator based on the received indicator operation request message in block 907. That is, the second device operates an indicator such as a display, an LED, a vibration motor, and a speaker depending on a device characteristic to inform the user that a connection from a different device is requested. For example, the second device may allow an LED to blink, generate vibration, or output an alarm signal via the speaker. Accordingly, the user may recognize that the connection from the peripheral device is requested, and input whether to approve the connection request from the relevant peripheral device via the second device.

Therefore, the second device determines whether a connection approval/rejection is input according to the user input in block 909.

When the connection approval/rejection is input according to the user input in block 909, the second device generates an indicator operation response and connection response message including connection response information (that is, connection approval/rejection), and transmits the generated indicator operation response and connection response message to a relevant peripheral device via the network in block 911.

The second device then ends the algorithm according to an embodiment of the present invention.

Figure 10:
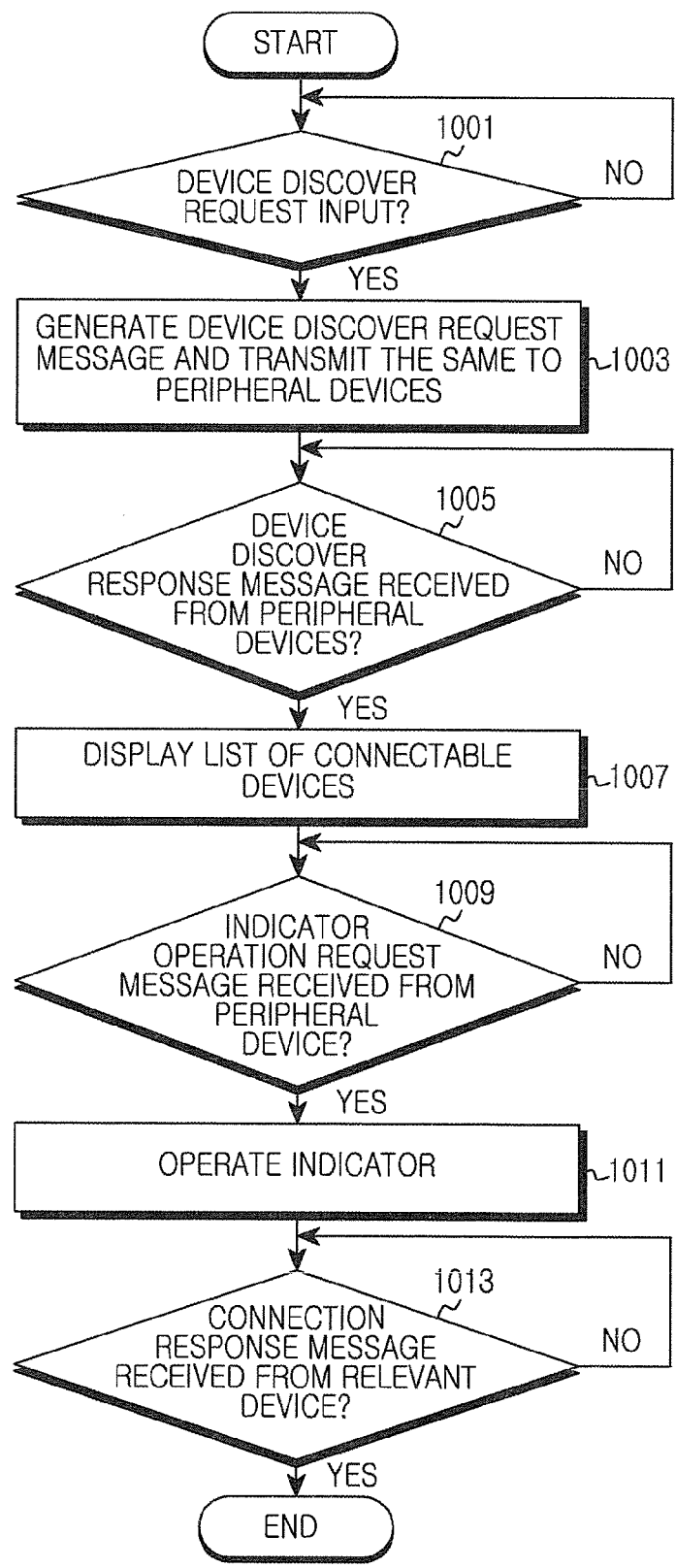
FIG. 10 illustrates a process for supporting bidirectional pairing between devices at a first device that requests a discover according to an embodiment of the present invention.

FIG. 10 illustrates a process for supporting bidirectional pairing between devices at a first device that requests a discover according to an embodiment of the present invention.

Referring to FIG. 10, the first device determines whether a connectable device discover request is input according to a user input or an application in block 1001.

When the connectable device discover request is input according to the user input or an application in block 1001, the first device generates a device discover request message, and transmits the generated device discover request message to peripheral devices (for example, a second device) via a network in block 1003. Here, the device discover request message includes information regarding a device type or a service type that the user desires to discover.

The first device determines whether a device discover response message is received from any of the peripheral devices via the network in block 1005.

When one or more device discover response message is received from the peripheral devices via the network in block 1005, the first device displays a list of connectable devices corresponding to information regarding a device type or a service type within the discover request message on a screen based on the device discover response messages received from the peripheral devices in block 1007.

Here, users of some peripheral devices in the list of the connectable devices may shake and move a relevant peripheral device in order to operate an indicator of the first device such that the relevant peripheral device may be intuitively recognized on the list of the connectable devices displayed on the screen of the first device. Accordingly, the relevant device may generate an indicator operation request message including movement recognition information to transmit the same to the first device via the network. Therefore, the first device determines whether an indicator operation request message is received from some peripheral devices in the list of the connectable devices via the network in block 1009.

When the indicator operation request message is received from some peripheral devices in the list of the connectable devices via the network in block 1009, the first device operates an indicator based on the indicator operation request message in block 1011. For example, the first device allows an icon corresponding to a peripheral device whose movement has been recognized to blink in the list of the connectable devices displayed on the display.

The user of the peripheral device may also input whether to approve a connection request from the first device to the relevant peripheral device, and accordingly, a connection response message including connection response information (that is, connection approval/rejection) may be provided to the first device via the network. Therefore, the first device determines whether the connection response message is received from the peripheral device via the network in block 1013.

When the connection response message is received from the peripheral device via the network in block 1013, the first device ends the algorithm according to an embodiment of the present invention.

Figure 11:
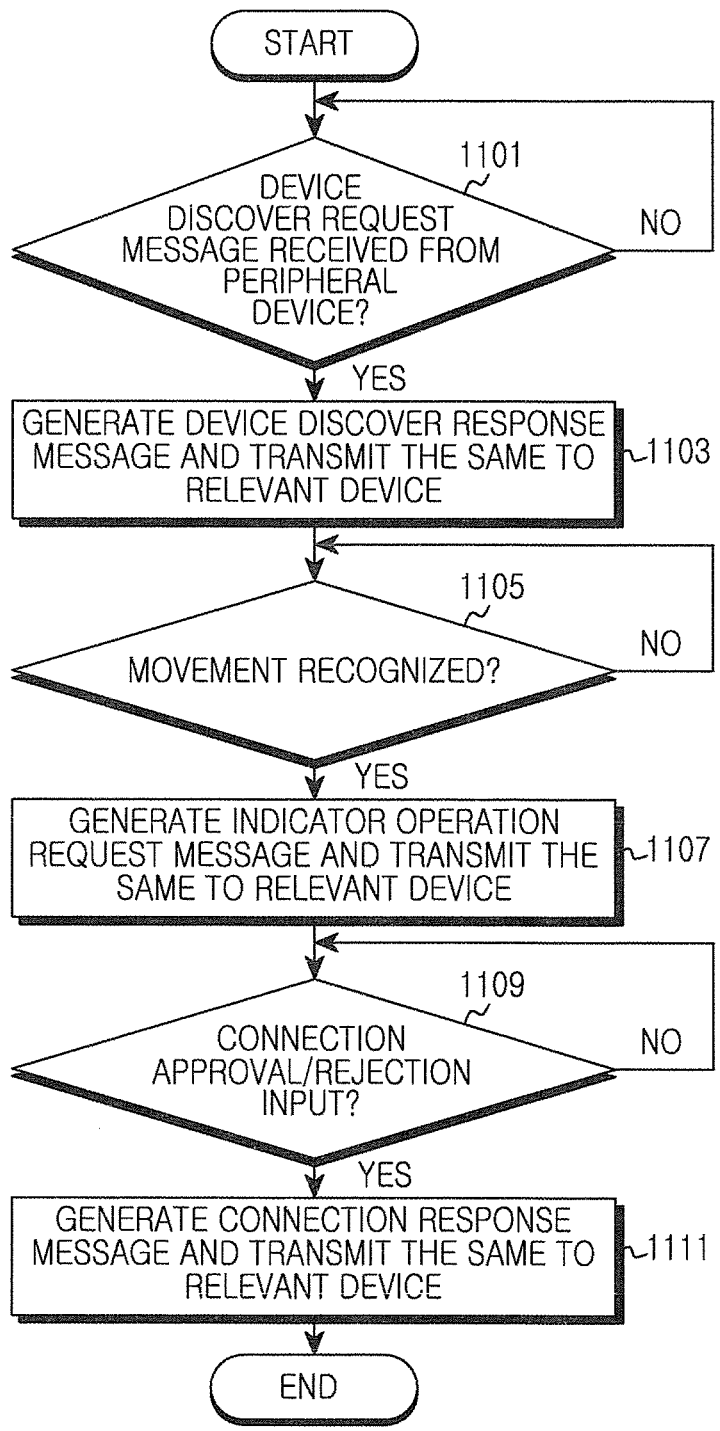
FIG. 11 illustrates a process for supporting bidirectional pairing between devices at a second device that receives a discover request according to an embodiment of the present invention.

FIG. 11 illustrates a process for supporting bidirectional pairing between devices at a second device that receives a discover request according to an embodiment of the present invention.

Referring to FIG. 11, the second device determines whether a device discover request message is received from a peripheral device (for example, a first device) via a network in block 1101. Here, the device discover request message includes information regarding a device type and a service type that a user desires to discover.

When the device discover request message is received from the peripheral device via the network in block 1101, the second device extracts information regarding the device type and the service type that the user desires to discover from the received device discover request message, determines whether a device or a service that the user desires to discover through the device discover request message is the second device itself or a service supported by the second device based on the extracted information, and then generates a device discover response message including the determination results to provide the same to a relevant peripheral device via the network in block 1103. Accordingly, the relevant peripheral device may display a list of connectable devices on a display based on the device discover response message.

Here, a user of the second device may shake and move the second device in order to operate an indicator of the relevant peripheral device such that the second device may be intuitively recognized on the list of the connectable devices displayed on the display of the relevant peripheral device. Therefore, the second device determines whether movement of the second device is recognized in block 1105.

When the movement of the second device is recognized in block 1105, the second device generates an indicator operation request message including movement recognition information and transmits the generated indicator operation request message to the peripheral device via the network in block 1107. Here, the peripheral device may operate an indicator based on the indicator operation request message. For example, the peripheral device may allow an icon corresponding to the second device whose movement has been recognized to blink in the list of the connectable devices displayed on the display.

The second device determines whether connection approval/rejection for the peripheral device is input according to the user's manipulation in block 1109.

When the connection approval/rejection is input according to the user's manipulation in block 1109, the second device generates a connection response message including connection response information (that is, connection approval/rejection) and transmits the generated connection response message to the peripheral device via the network in block 1111.

After that, the second device ends the algorithm according to an embodiment of the present invention.

Though the present invention has been described using an example where the above embodiments are separately realized, they may be realized together.

As described above, embodiments of the present invention have an advantage of improving user convenience by operating a device's indicator (for example, an LED, a vibration motor, a speaker, and a display) that makes it easy for the user to intuitively recognize a discovered device and try a connection. In addition, embodiments of the present invention have an advantage of being able to connect devices without a display when an indicator suitable for a device characteristic is used.

Although the present disclosure has been described with embodiments, various changes and modifications may be suggested to one skilled in the art. It is intended that the present disclosure encompass such changes and modifications as fall within the scope of the appended claims.

What is claimed is:

1. A method of operating a first device for pairing between pairable devices, the method comprising:
   transmitting, at a first device, a discover request message for discovering at least one connectable peripheral device;
   receiving a discover response message from the at least one connectable peripheral device;
   displaying a list of connectable peripheral devices based on the discover response message;
   selecting a second device for operating an indicator of the second device from the displayed list;
   transmitting an indicator operation request message for operating the indicator of the second device to the second device before pairing with the second device;
   receiving a second indicator operation request message for operating an indicator of the first device from the second device that is sent in response to detection of movement of the second device;
   operating the first device indicator in response to reception of the second indicator operation request message; and
   pairing with the second device, when a connection response message is received from the second device,
   wherein the second device operates the indicator depending on reception of the indicator operation request message to identify the second device from other connectable peripheral devices.

2. The method of claim 1, wherein the indicator of at least one of the first device and the second device comprises at least one of a display, a Light Emitting Diode (LED), a vibration motor, and a speaker.

3. The method of claim 1, wherein the discover request message comprises information regarding at least one of a device type and a service type that a user desires to discover.

4. The method of claim 3, further comprising:
   receiving, at the second device, the discover request message from the first device;
   determining whether the device or service type is supported by the second device based on the information;
   transmitting the discover response message to the first device in response to determining that device or service type is supported;
   receiving, before pairing with the first device, the indicator operation request message requesting an operation of the indicator of the second device from the first device;
   operating the indicator of the second device according to the indicator operation request message to distinguish the second device from the other discovered connectable peripheral devices; and
   transmitting a connection response message to the first device.

5. The method of claim 4, wherein the discover response message comprises results from a determination of whether the device supports at least one of the device or service type.

6. The method of claim 4, further comprising transmitting an indicator operation response and the connection response message comprising connection approval/rejection information to the first device.

7. The method of claim 4, further comprising:
   determining, after transmitting the discover response message, whether the movement of the second device is recognized;
   generating the second indicator operation request message for operating the indicator of the first device, when the movement of the second device is recognized; and
   transmitting the generated second indicator operation request message to the first device,
   wherein the first device operates the indicator depending on reception of the second indicator operation request message.

8. The method of claim 1, further comprising receiving an indicator operation response and the connection response message comprising connection approval/rejection information from the second device.

9. The method of claim 1, further comprising: operating, at the second device, the indicator of the second device to discriminate the second device from the connectable peripheral devices in response to receipt of a user input, when the indicator operation request message is received from the first device.

10. The method of claim 1, wherein operating the indicator of the first device comprises displaying the indicator at the first device in association with a location of an identifier of the second device in the displayed list of connectable peripheral devices.

11. A device for pairing between devices, the device comprising:
    a device discover request unit configured to transmit a discover request message for discovering at least one connectable peripheral device, receive a discover response message from the at least one connectable peripheral device and transmit an indicator operation request message for operating an indicator of a second device selected in a list of connectable peripheral devices; and
    a connection input unit configured to:
       display the list of connectable peripheral devices based on the discover response message,
       select the second device for operating the indicator of the second device from the displayed list of the connectable peripheral devices,
       transmit the indicator operation request message for operating an indicator of the second device to the second device before pairing with the second device,
       receive a second indicator operation request message for operating an indicator of the device from the second device that is sent in response to detection of movement of the second device,
       operate the first device indicator in response to reception of the second indicator operation request message, and
       pair with the second device, when a connection response message is received from the second device,
    wherein the second device operates the indicator depending on reception of the indicator operation request message to identify the second device from other connectable peripheral devices.

12. The device of claim 11, wherein the indicator of at least one of the first device and the second device comprises at least one of a display, a Light Emitting Diode (LED), a vibration motor, and a speaker.

13. The device of claim 11, wherein the discover request message comprises information regarding at least one of a device type and a service type that a user desires to discover.

14. The device of claim 13, the device comprising:
a device discover response unit configured to receive a discover request message from a peripheral device including information regarding a device or service type to be discovered by the peripheral device, determine whether the device or service type is supported by the device based on the information, transmit a discover response message to the peripheral device, and receive, before pairing with the peripheral device, the second indicator operation request message requesting an operation of the indicator of the device from the peripheral device; and
a connection indicator configured to operate the indicator of the device according to the indicator operation request message to distinguish the device from the other peripheral devices.

15. The device of claim 14, wherein the discover response message comprises results from a determination of whether the device supports at least one of the device or service type.

16. The device of claim 14, wherein the device is further configured to:
determine, after transmitting the discover response message, whether the movement of the second device is recognized,
generate the indicator operation request message for operating the indicator of the second device, when the movement of the second device is recognized, and
transmit the generated indicator operation request message to the second device,
wherein the second device operates the indicator depending on reception of the indicator operation request message.

17. The device of claim 11, wherein the connection input unit is further configured to receive an indicator operation response and the connection response message comprising connection approval/rejection information from the second device.

18. The device of claim 11, wherein the second device is configured to operate the indicator of the second device to discriminate the second device from the connectable devices in response to receipt of a user input, when the indicator operation request message is received from the device.

* * * * *